US010747782B2

(12) United States Patent
Chatterjee et al.

(10) Patent No.: US 10,747,782 B2
(45) Date of Patent: Aug. 18, 2020

(54) EFFICIENT DUAL-OBJECTIVE CACHE

(71) Applicant: Oracle International Corporation, Redwood Shores, CA (US)

(72) Inventors: Roshni Chatterjee, Milpitas, CA (US); William Henry Benjamin Habeck, Redwood City, CA (US); Preetham Solomon, Alameda, CA (US); Sue-Kyoung Lee, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 15/685,489

(22) Filed: Aug. 24, 2017

(65) Prior Publication Data

US 2018/0081959 A1 Mar. 22, 2018

Related U.S. Application Data

(60) Provisional application No. 62/396,060, filed on Sep. 16, 2016.

(51) Int. Cl.
*G06F 16/28* (2019.01)
*G06F 12/0813* (2016.01)
(Continued)

(52) U.S. Cl.
CPC ........ *G06F 16/283* (2019.01); *G06F 12/0223* (2013.01); *G06F 12/0813* (2013.01);
(Continued)

(58) Field of Classification Search
CPC ............. G06F 16/283; G06F 16/24552; G06F 16/24556; G06F 12/0223; G06F 12/0866;
(Continued)

(56) References Cited

U.S. PATENT DOCUMENTS

| 5,897,634 A | 4/1999 | Attaluri et al. |
| 6,078,994 A | 6/2000 | Carey |

(Continued)

FOREIGN PATENT DOCUMENTS

KR 10-2010-0131054 12/2010

OTHER PUBLICATIONS

U.S. Appl. No. 13/037,172, filed Feb. 28, 2011, Office Action, dated Nov. 5, 2015.
(Continued)

*Primary Examiner* — David Yi
*Assistant Examiner* — Alan Otto
(74) *Attorney, Agent, or Firm* — Hickman Palermo Becker Bingham LLP

(57) ABSTRACT

Techniques are described herein for effectively managing usage of a shared object cache in a container database management system (DBMS). The shared object cache maintains shared objects belonging to a set of pluggable databases (PDBs) hosted by the container DBMS. In an embodiment, a shared object metadata extension structure (SOMEX) is maintained for each PDB. The SOMEX stores metadata for each shared object of the PDB that resides in the shared object cache. In an embodiment, a share of the shared object cache is maintained for shared objects from each PDB in the set of PDBs based on entries in the SOMEX for the PDB.

24 Claims, 8 Drawing Sheets

(51) Int. Cl.
    *G06F 16/2455*     (2019.01)
    *G06F 12/02*     (2006.01)
    *G06F 12/0866*     (2016.01)

(52) U.S. Cl.
    CPC .... *G06F 12/0866* (2013.01); *G06F 16/24552* (2019.01); *G06F 16/24556* (2019.01); *G06F 2212/163* (2013.01); *G06F 2212/465* (2013.01)

(58) Field of Classification Search
    CPC ........... G06F 12/0813; G06F 2212/163; G06F 2212/465
    See application file for complete search history.

(56) References Cited

U.S. PATENT DOCUMENTS

| | | | |
|---|---|---|---|
| 6,434,672 | B1 | 8/2002 | Gaither |
| 6,557,082 | B1 | 4/2003 | Josten et al. |
| 7,581,064 | B1 | 8/2009 | Zedlewski |
| 7,822,727 | B1 | 10/2010 | Shaughnessy |
| 7,840,752 | B2 | 11/2010 | Hu et al. |
| 8,489,820 | B1 | 7/2013 | Ellard |
| 9,703,706 | B2 * | 7/2017 | Bagal .................. G06F 12/0811 |
| 2002/0026448 | A1 | 2/2002 | Bird et al. |
| 2002/0052914 | A1 | 5/2002 | Zalewski et al. |
| 2004/0215883 | A1 | 10/2004 | Bamford et al. |
| 2005/0193160 | A1 | 9/2005 | Bhatt et al. |
| 2005/0204112 | A1 | 9/2005 | O'Connor et al. |
| 2005/0223174 | A1 | 10/2005 | Mogi |
| 2006/0143256 | A1 | 6/2006 | Galchev |
| 2006/0248131 | A1 | 11/2006 | Marwinski et al. |
| 2007/0233991 | A1 * | 10/2007 | Diao ..................... G06F 9/5016 711/170 |
| 2009/0164733 | A1 | 6/2009 | Kim et al. |
| 2009/0276654 | A1 | 11/2009 | Butterworth et al. |
| 2010/0122026 | A1 | 5/2010 | Umamageswaran et al. |
| 2010/0185817 | A1 | 7/2010 | Magenheimer |
| 2010/0287339 | A1 * | 11/2010 | Olszewski ............ G06F 12/084 711/128 |
| 2011/0113036 | A1 | 5/2011 | Idicula et al. |
| 2012/0005158 | A1 | 1/2012 | Bhatt et al. |
| 2012/0221768 | A1 | 8/2012 | Bagal et al. |
| 2014/0164331 | A1 * | 6/2014 | Li ....................... G06F 11/1471 707/648 |
| 2014/0181410 | A1 * | 6/2014 | Kalamatianos ....... G06F 12/121 711/133 |

OTHER PUBLICATIONS

U.S. Appl. No. 13/037,172, filed Feb. 28, 2011, Office Action, dated Nov. 6, 2014.
U.S. Appl. No. 13/037,172, filed Feb. 28, 2011, Interview Summary, dated Jul. 5, 2016.
U.S. Appl. No. 13/037,172, filed Feb. 28, 2011, Interview Summary, dated Nov. 9, 2016.
U.S. Appl. No. 13/037,172, filed Feb. 28, 2011, Final Office Action, dated Apr. 16, 2015.
U.S. Appl. No. 13/037,172, filed Feb. 28, 2011, Final Office Action, dated Mar. 29, 2016.
U.S. Appl. No. 13/037,172, filed Feb. 28, 2011, Advisory Action, dated Jul. 12, 2016.
Bagal, U.S. Appl. No. 13/037,172, filed Feb. 28, 2011, Office Action, dated Nov. 9, 2016.
Bagal, U.S. Appl. No. 13/037,172, filed Feb. 28, 2011, Notice of Allowance, dated Mar. 1, 2017.
Bagal, U.S. Appl. No. 13/037,172, filed Feb. 28, 2011, Office Action, dated Jan. 7, 2013.
Yadgar et al., "Karma: Know it All Replacement for a Multilevel Cache", dated Jan. 1, 2007, 16 pages.
Wong, Theodore M., and Wilkes, John, "My cache or yours? Making storage more exclusive." Jun. 2002. USENIX. FAST '02.
Venkatarman, Shivakumar, Global Memory Management for Multi-Server Database Systems. 1996. University of Wisconsin—Madison. pp. 24-32.
Soundararajan, Gokul et al., "Dynamic Partitioning of the Cache Hierarchy in Shared Data Centers." Aug. 2008. ACM. '08. pp. 635-646.
Rik Van Riel "Page replacement in Linux 2.4 memory management." Jun. 2001. USENIX; FREENIX 2001.
Peetz, Andreas, "A Myth Busted and an FAQ: ESXi is *not* Based on Linux! But what is it?", dated Aug. 2013, http://www.vfront.de/2013/08a-myth-busted-and-faqe-sxi-is-not based.html.
Liu, Xin et al. "CLIC: Client-Informed Caching for Storage Servers." Feb. 2009. USENIX. FAST '09. pp. 297-310.
Koltsidas, Ioannis and Viglas, Stratis D., "The Case for Flash-Aware Multi-Level Caching." 2009. University of Edinburgh. Tech Report EDI-INF-RR-1319.
Jung, Hoyoung et al. "LRU-WSR: Integration of LRU and Write Sequence Reordering for Flash Memory." Aug. 2008. IEEE. IEEE Transactions on Consumer Electronics. vol. 54. pp. 1215-1223.
Hennessy, John L., and Patterson, David A., Computer Architecture: A Quantitative Approach. 2007; Elsevier. 4th ed. pp. 287-315.
Chandrasekaran, Sashikanth and Bamford, Roger, "Shared Cache—The Future of Parallel Databases." Mar. 2003. ICDE'03. pp. 840-850.
"In the Lab: Full ESX/vMotion Test Lab in a Box, Part 2", dated Aug. 2009, https://blog.solori.net/2009/08/17/in-the-lab-full-escmotion-test-lab-in-a-box-part-2/.
"In the Lab: Full ESX/vMotion Test Lab in a Box, Part 1", dated Aug. 2009, https://blog.solori.net/2009/08/17/in-the-lab-full-escmotion-test-lab-in-a-box-part-1/.

* cited by examiner

EFFICIENT DUAL-OBJECTIVE CACHE

CROSS-REFERENCE TO RELATED APPLICATIONS; BENEFIT CLAIM

This application claims priority to U.S. Provisional Application No. 62/396,060, entitled EFFICIENT DUAL-OBJECTIVE CACHE, filed on Sep. 16, 2016 herewith by Roshni Chatterjee, et. al., the contents of which are incorporated herein by reference.

FIELD OF THE INVENTION

The present invention relates to shared object cache management in database systems for multitenant architectures.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database management system (DBMS) manages a database, and may have one or more database servers. A database comprises database data and a database dictionary that are stored on a persistent memory mechanism. An extension of a DBMS is a container DBMS, which contains multiple individual databases that are hosted and managed by a database server. The individual databases are called Pluggable Databases ("PDBs"). A container DBMS may contain numerous PDBs. A user may access a PDB within a container DBMS by establishing a database session for a PDB.

A container DBMS is a powerful mechanism for database consolidation. A container DBMS provides a high degree of computer resource sharing while concurrently providing a high degree of isolation.

The isolation provided by a container DBMS is at an existential level. Database sessions established for a PDB may be limited to accessing or otherwise viewing database objects defined for the PDB by the PDB's dedicated database dictionary.

While database objects may be isolated between database sessions of PDBs, various computing resources may be shared across database sessions of PDBs. Hosting multiple PDBs on same database server thus allows the computing resources of database servers or instances to be shared between multiple PDBs.

Among the computer resources shared between multiple PDBs is a shared object cache of a database server. The shared object cache is used to cache shared database objects used by the various database sessions of the PDBs hosted on a database server. Because the shared object cache is a computer resource that is shared by database sessions of multiple PDBs, balancing its usage between PDBs is an important function for a container DBMS. Described herein are techniques for more effectively managing the usage of the shared object cache in a container DBMS.

DETAILED DESCRIPTION

Figure 1:
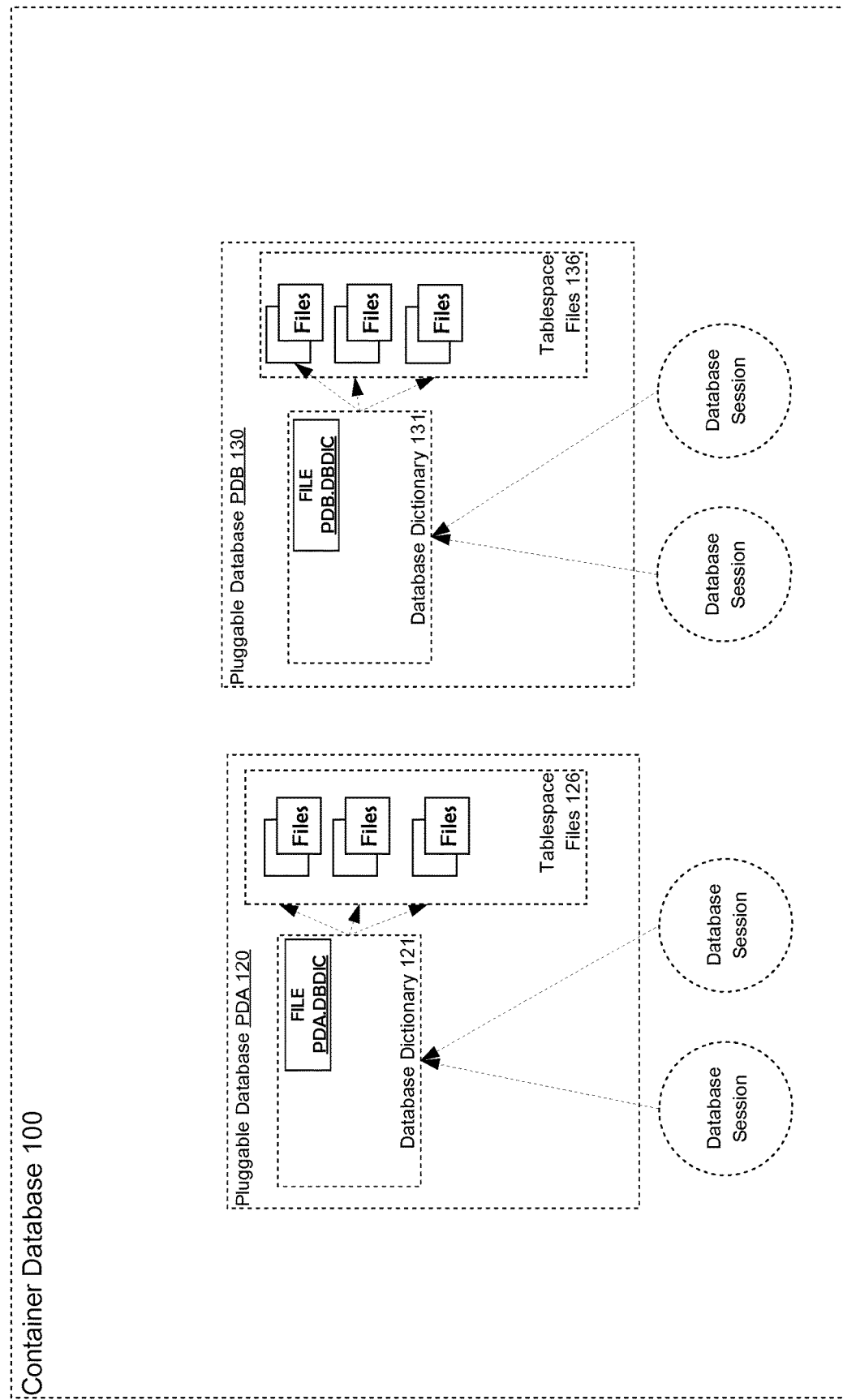
FIG. 1 is a diagram depicting a Container Database according to an embodiment of the present invention.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Among the computer resources shared between multiple PDBs in a container DBMS is a shared object cache. The shared object cache is used to cache shared database objects used by the various database sessions of the PDBs hosted on a database server. For each PDB in a container DBMS, a per-PDB data-structure is maintained. This data-structure lists all the shared memory objects of that PDB that reside in the shared object cache. This per-PDB data-structure (referred in later sections as: "shared object metadata extension structure" (SOMEX)) facilitates efficient cache management of the shared object cache for an individual PDB. For example, the portion of the shared object cache used to store shared objects of a particular PDB may be limited to a particular size. Maintaining this limit may involve identifying all the shared objects of that PDB in the shared object cache as well as their sizes. This determination is greatly simplified by traversing the per-PDB data structure to identify the objects in the shared object cache for that PDB. This approach may be much more efficient than traversing the entire shared object cache, which can store objects for a thousand or more PDBs.

In addition, per-PDB activity data maintained in the per-PDB data structure facilitates efficient per PDB cache management. For example, the per-PDB data structure maintains timestamps for each of its shared objects in the shared object cache. When a shared object residing in the shared object cache is requested for processing (i.e., the shared object receives a cache hit), the shared object's timestamp maintained in the per-PDB data structure is updated. A header for the per-PDB data structure may maintain the oldest timestamp from among all the shared objects of the PDB in the shared object cache. Just reviewing this header can then provide information about the oldest use for a shared object of that PDB in the shared object cache.

As noted previously, the embodiments of the invention are implemented within a container DBMS. A brief description of a DBMS and container DBMS is therefore useful.

General Overview: Database Systems

A DBMS manages a database. A DBMS may comprise one or more database servers. A database comprises database data and a database dictionary that are stored on a persistent memory mechanism, such as a set of hard disks. Database data may be stored in one or more data containers. Each container contains records. The data within each record is organized into one or more fields. In relational DBMSs, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Users interact with a database server of a DBMS by submitting to the database server commands that cause the database server to perform operations on data stored in a database. A user may be one or more applications running on a client computer that interact with a database server. Multiple users may also be referred to herein collectively as a user.

A database command may be in the form of a database statement that conforms to a database language. A database language for expressing the database commands is the Structured Query Language (SQL). There are many different versions of SQL, some versions are standard and some proprietary, and there are a variety of extensions. Data definition language ("DDL") commands are issued to a database server to create or configure database objects, such as tables, views, or complex data types. SQL/XML is a common extension of SQL used when manipulating XML data in an object-relational database.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid, which is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of resources from a node is a server that is referred to herein as a "server instance" or "instance". A database server may comprise multiple database instances, some or all of which are running on separate computers, including separate server blades.

General Overview: Container Database

Figure 2:
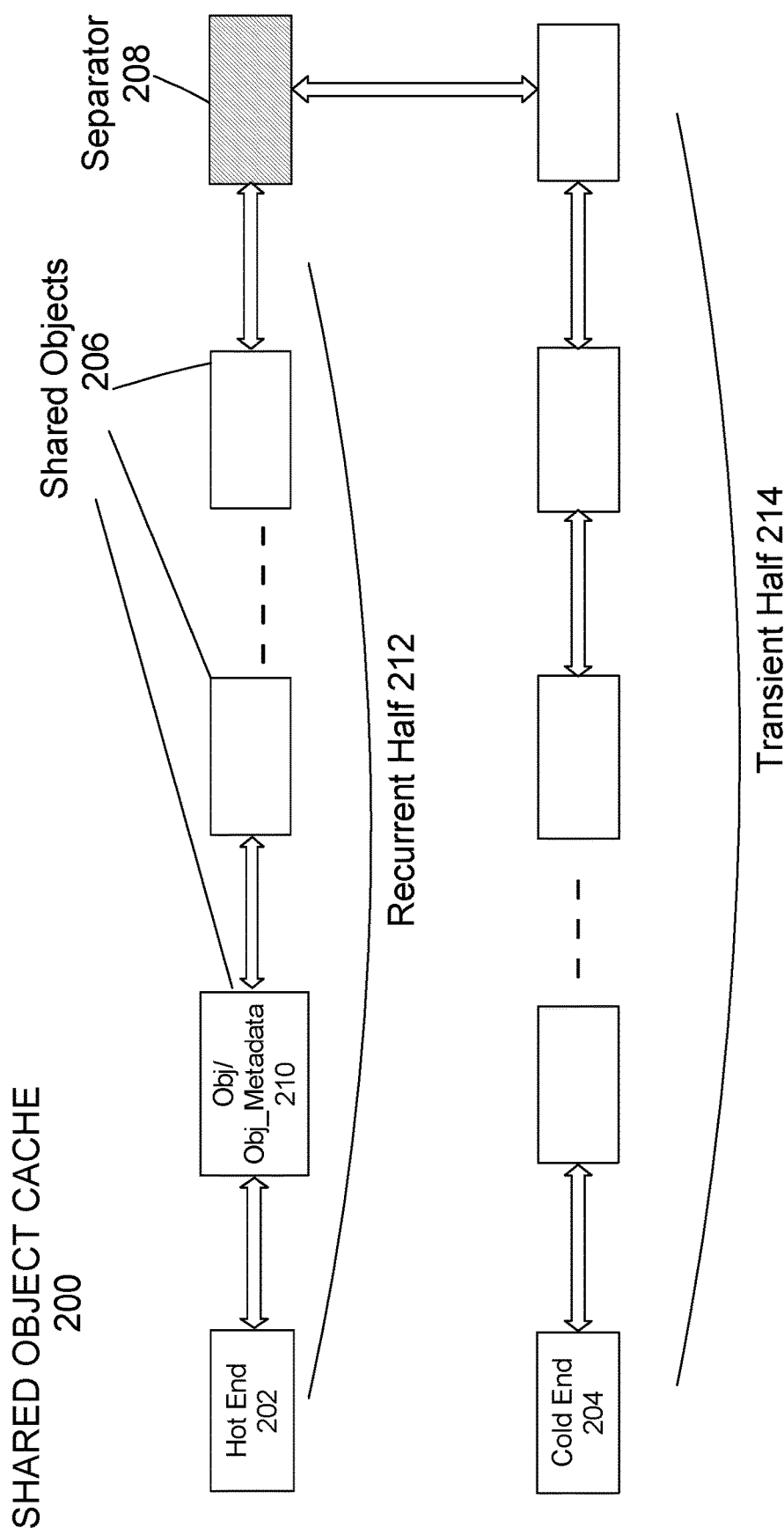
FIG. 2 is a diagram depicting a shared object cache maintaining shared objects.

FIG. 1 depicts a Container DBMS 100, a container DBMS according to an embodiment of the present invention. Container DBMS 100 contains multiple databases that are hosted and managed by a database server. The databases include Pluggable Database PDA 120 and Pluggable Database PDA 130. Pluggable databases, such as Pluggable Database PDA 120, Pluggable Database PDA 130, are collectively referred to herein as a container database. A container DBMS may contain more pluggable databases than the number of pluggable databases that are depicted in FIG. 2.

Referring to FIG. 1, Pluggable Database PDA 120 includes Database Dictionary 121. Data for database objects of Pluggable Database PDA 120 is stored in Tablespace Files 126. Similar to user data, metadata for a database dictionary is stored persistently in a dictionary store. Metadata contained in Database Dictionary 121 is stored in file PDA.D-BDIC.

Pluggable Database PDB 130 includes Database Dictionary 131. Tablespace Files 136 store data for database objects of Pluggable Database PDB 130. Metadata for a Database Dictionary 131 is stored persistently in file PDB.DBDIC.

A database dictionary of the pluggable database may be referred to herein as a pluggable database dictionary. A database object defined by a pluggable database dictionary that is not a common database object is referred to herein as a pluggable database object. Details about the container DBMS may be found in U.S. patent application Ser. No. 15/331,525, herein incorporated by reference in entirety.

Shared Object Cache

When a database connection request is received for a pluggable database (PDB) at a database server, a database session is established for the PDB. Thus, when multiple database connection requests are received for multiple PDBs in the container database, correspondingly, multiple database sessions are established at the database server.

A shared object cache is allocated in the volatile memory of the database server such that it serves as a common cache for shared objects across all the multiple processes for the multiple database sessions that are executing at the database server. These shared objects may belong to any one of the PDBs involved in the multiple database sessions that are executing at the server.

Without being limiting, a shared object refers to objects that are shared between multiple processes that are executing at the database server. These shared objects include partial query results, library cache objects, and row cache objects, among others.

Maintaining a shared object cache refers to operations performed to add, remove, and retain shared objects in a shared object cache according to a cache management goal or policy. Policy examples include retaining the most recently or frequently accessed objects in the shared object cache, evicting shared objects least likely to be accessed in the shared object cache, moving the shared objects in the shared object cache from a hot end to a cold end as they remain in the shared object cache, or preventing a minimum share of a PDB's shared objects from being evicted. The shared objects for the multiple executing processes are maintained in the shared object cache until space needs to be freed up. Processes requiring memory in the shared object cache may scan the shared object cache to evict objects while enforcing mutual exclusion through latches or locks. Evicting a shared object may involve using any one of several policies to identify and remove shared objects from the shared object cache, including, without limitation, Least Recently Used (LRU), Most Recently Used (MRU), Least Frequently Used (LFU), touch-up policies, and/or various combinations and modifications thereof.

FIG. 2 depicts a Shared Object Cache 200 that maintains the shared objects across all the multiple PDBs involved in the multiple database sessions that are executing on a container DBMS (such as Container DBMS 100 shown in FIG. 1). For purposes of exposition, only some aspects of the shared object cache are depicted in FIG. 2. The Shared Object Cache 200 comprises multiple shared objects, Shared Objects 203, that may belong to any one of the PDBs maintained in the container DBMS (not shown). The Shared Object Cache 200 may be implemented, without limitation, as a data structure comprising doubly-linked list of objects that is divided into two halves by a Separator 205. The Separator 205 may be a marker object that may be moved periodically during cache management in order to keep the two halves of the entire set of shared objects on either side of the Separator 205 approximately balanced. The Shared Object Cache 200 has a Hot End 201 and a Cold End 202. The Hot End 201 represents one end of the shared object cache; the shared objects between the Hot End 210 and the Separator 205 are also referred to as the Recurrent Half 215, with shared objects that will stay longer in the shared object cache. Similarly, the Cold End 202 represents the other end of the shared object cache; the shared objects between the Cold End 202 and the Separator are also referred to as the Transient Half 225, with shared objects that might be evicted from the shared object cache when necessary. In the case of an LRU policy implementation, the separator represents where a most recently used shared object enters the shared object cache and the hot end represents where a frequently used shared object enters the recurrent half, i.e., in the half of the shared object cache where the shared objects will stay longer in the cache. The cold end represents where the least recently used oldest shared object resides, i.e., the shared object that is next evicted from the shared object cache when necessary.

Along with each shared object, the Shared Object Cache 200 also stores metadata associated with the shared object. This metadata is also referred to as "in-cache metadata". The in-cache metadata may include, without limitation, an identifier for the PDB that the object belongs to, a type of the shared object, and flag information depicting a status of the shared object, etc. Obj/ObjMetadata 210 depicts the combined shared object and its metadata as stored in the Shared Object Cache 200.

Given that a single Shared Object Cache 200 is maintained for shared objects over all the PDBs in a container DBMS, some performance difficulties are identified below:

First difficulty involves identifying shared objects in the cache for eviction. When a need arises to free up space in Shared Object Cache 200, a cache management process scans the cache in order to select a shared object to evict. As noted earlier, an eviction policy may be any of an LRU, an MFU, an MRU or some other policy. This eviction poses a challenge for several reason: the shared objects in the Shared Object Cache 200 may not be strictly in an order that facilitates rapid and efficient identification and removal and the Shared Object Cache 200 holds shared objects for many PDBs, which can number in the thousands.

For instance, in an exemplary LRU policy embodiment, often, the shared objects in the shared object cache may not be in strict timestamp order. This means that when a process wishes to evict a shared object for a particular PDB from the shared object cache, it may, in the worst case, need to scan the entire transient half of the shared object cache, which include shared objects of other PDBs that cannot be selected for eviction, in order to find a suitable candidate for eviction. This is not a scalable approach, and leads to inefficient use of the shared object cache.

Second difficulty involves enforcing balanced usage of the shared object cache by all the PDBs. For instance, when an executing application is using shared objects currently residing in the shared object cache, an improperly managed error condition occurring during execution of the application code may cause a shared object to grow as a result of a memory leak. Thus, the PDB from which the shared object originates may use more of the shared object cache space for its shared objects. This can deprive other PDBs of the PDB's share of the shared object cache.

In addition, it is entirely possible that different PDBs in a container database become active at different times. For example, a PDB in a container database may become active at 8 a.m. PDB A becomes active when it is 8 a.m. in Time Zone 1 (TZ1), and PDB B becomes active when it is 8 a.m. in Time Zone 2 (TZ2), which is 3 hours behind Time Zone 1. When it is 8 a.m. in TZ1, PDB A becomes active, and has taken up much of the shared object cache space. When PDB B becomes active at 8 am in TZ2, it may not have an adequate share of the shared object cache, because of the disproportionate usage of the shared object cache caused by earlier database activities involving PDB A. Therefore, there needs to be an approach for managing usage of the shared object cache between PDBs to optimize performance for each PDB as well as the Container DBMS 100 overall.

Shared Object Cache Enforcing Dual-Objectives

Resolution of the above issues is facilitated through the use of a Shared Object Cache that enforces dual objectives.

A dual-objective shared object cache management system implements a first objective of maintaining instance-wide cache properties of the shared object cache across all shared objects of multiple PDBs, and also implements a second objective of maintaining bounds on the size of the shared object cache allocated for shared objects of each PDB. The dual-objectives enforced in the shared object cache ensures optimal performance of the shared object cache across all PDBs at all times, providing fairness among all PDBs.

The bounds are enforced on the size of the shared object cache for each PDB by maintaining predefined maximum size limits on the share of the shared object cache allocated for shared objects of each PDB. Without limitation, these predefined limits may be the same for all the PDBs in the container database, or may be set individually for each PDB. In the latter case, a PDB's share of the shared object cache may be individually based on constraints, such as the size of the PDB, the type of the PDB, or historical statistical information including typical duration of stay of shared objects from the PDB in the shared object cache, typical number of hits for shared objects from the PDB in the shared object cache, etc.

Enforcing a particular size limit for a PDB at any instant presents difficulties. For example, a shared object cache can contain several thousand shared objects. If it is established that a particular PDB A is exceeding PDB A's share of the shared object cache, cache management policy for maintaining a size limit requires that one or more shared objects be evicted from the shared object cache in order to meet a size limit. Thousands of shared objects may have to be traversed in time-wise order from coldest to hottest in search of shared objects from PDB A. It is clear that such a traversal of the shared object cache is going to visit many shared objects that are not of PDB A. For example, if there are 1000 PDBs and all the shared objects belonging to the PDBs are perfectly randomly distributed on the shared object cache, then in the worst-case scenario, in order to remove a shared object from the cache that is of PDB A, 999 shared objects of other PDBs are scanned. In the average-case scenario, 500 shared objects of other PDBs are scanned. Thus, to evict 100 shared objects of interest (i.e., of particular PDB), the worst-case scenario results in scanning of approximately 100,000 shared objects of no interest (i.e., of other PDBs).

One possible solution is to have PDB-specific caches for all the PDBs. Every PDB has its own dedicated cache. Then, evicting particular objects from the shared object cache involves traversing just the PDB-specific cache. However, the information regarding the coldest object among the entire set of shared objects in all the PDB-specific caches is lost. Furthermore, the overall goal of shared resources for a container DBMS-wide set of PDBs is frustrated as well.

Another possible solution is to have a PDB-specific cache in addition to the shared object cache. This is an inefficient solution since it will require maintaining and updating both the shared object cache as well as the PDB-specific cache.

The implementations of a shared object cache, described hereafter, resolves issues mentioned above. The shared object cache satisfies the dual objectives of maintaining instance-wide cache properties across all shared objects in the cache, and maintaining bounds on the size of the cache allocated for shared objects of each PDB by using two additional data structures: (i) a shared object metadata extension structure for each PDB, and (ii) a dedicated "min-cache" for each PDB.

Shared Object Metadata Extension Structure

The shared object cache is used for the shared objects as needed for container DBMS wide operations. In addition, for each PDB, a "shared object metadata extension structure" (SOMEX) is constructed. The SOMEX of each PDB maps into the shared object cache as described below. Size limitations are enforced for a PDB's share of the shared object cache using this mapping and other information in the SOMEX. The SOMEX for a PDB stores additional metadata for each shared object from the PDB that is in the shared object cache, and this information enables efficient rapid identification, eviction victim selection, and maintenance of shared objects in the shared object cache.

For example, for 1000 PDBs and a perfectly random distribution of PDB shared objects on a shared object cache, in order to free up 100 objects of interest (i.e., belonging to a particular PDB), in the present approach using the metadata provided in the PDB's SOMEX, only objects in the PDB's SOMEX need to be traversed unlike the previously described scenario of traversing 100*1000 objects.

Maintaining a SOMEX for a PDB refers to operations to create a SOMEX for a PDB, add and remove entries in the SOMEX corresponding to shared objects being added or evicted from the shared object cache. Maintaining also refers to updating entries corresponding to shared objects as they move in the shared object cache from the hot toward the cold end, maintaining the latest timestamp of a shared object in the shared object cache, and any other activities involving the SOMEX entries and the SOMEX header.

According to an embodiment, the SOMEX for each PDB is arranged in an array, so scanning the objects is more efficient than following the links in, for example, a shared object cache, that have no predictable address pattern. Each PDB can have multiple SOMEXs. In some embodiments, these multiple SOMEXs may be connected as a singly linked list.

In a preferred embodiment, each SOMEX for a PDB may be implemented, without limitation, as a structure-header element followed by a fixed size array of metadata extension entries for each object of the PDB that is in the shared object cache. Each shared object in the shared object cache has a pointer to its entry in the SOMEX for its PDB. Similarly, each object's metadata extension entry in the SOMEX, in turn, points back to the shared object in the shared object cache. The metadata extension for a shared object that is stored in its entry in the SOMEX includes, without limitation, timestamp information about the shared object (i.e., time of last hit for the shared object in the shared object cache), size of the object, and number of hits. The timestamp information provides valuable information for determining when the object may be sufficiently cold to be considered a replacement object for eviction, and for comparing against other shared objects in the shared object cache. Other metadata extension information for a shared object may include frequency of hits, duration of stay in the shared object cache, among others. In addition to the shared object metadata extension entries, the SOMEX also stores header information.

In an embodiment, size information associated with the overall size of all objects from that PDB in the shared object cache, i.e., the size of the PDB, is maintained in an additional data structure associated with each PDB called the PDBInfo. The PDBInfo also maintains a pointer to the first SOMEX of the PDB. The SOMEX header maintains the oldest timestamp of a shared object listed in the SOMEX. The overall size information may be useful in determining when a PDB reaches a size limit, maximum or minimum, of the PDB's share of the shared object cache, or when there may be a requirement to free up a certain amount of memory for a needed eviction. The oldest timestamp of an object in the SOMEX facilitates finding the coldest shared object when it is required to free up shared object cache memory for a particular PDB. If the oldest timestamp is "too new" then it may be possible to skip searching that SOMEX for the PDB and move directly to examining the PDB's next SOMEX (if any).

There are two sets of metadata for each shared object in the shared object cache. The first set of metadata resides along with the shared object in the shared object cache. The second set of metadata resides in the PDB's SOMEX entry for the shared object.

Figure 3:
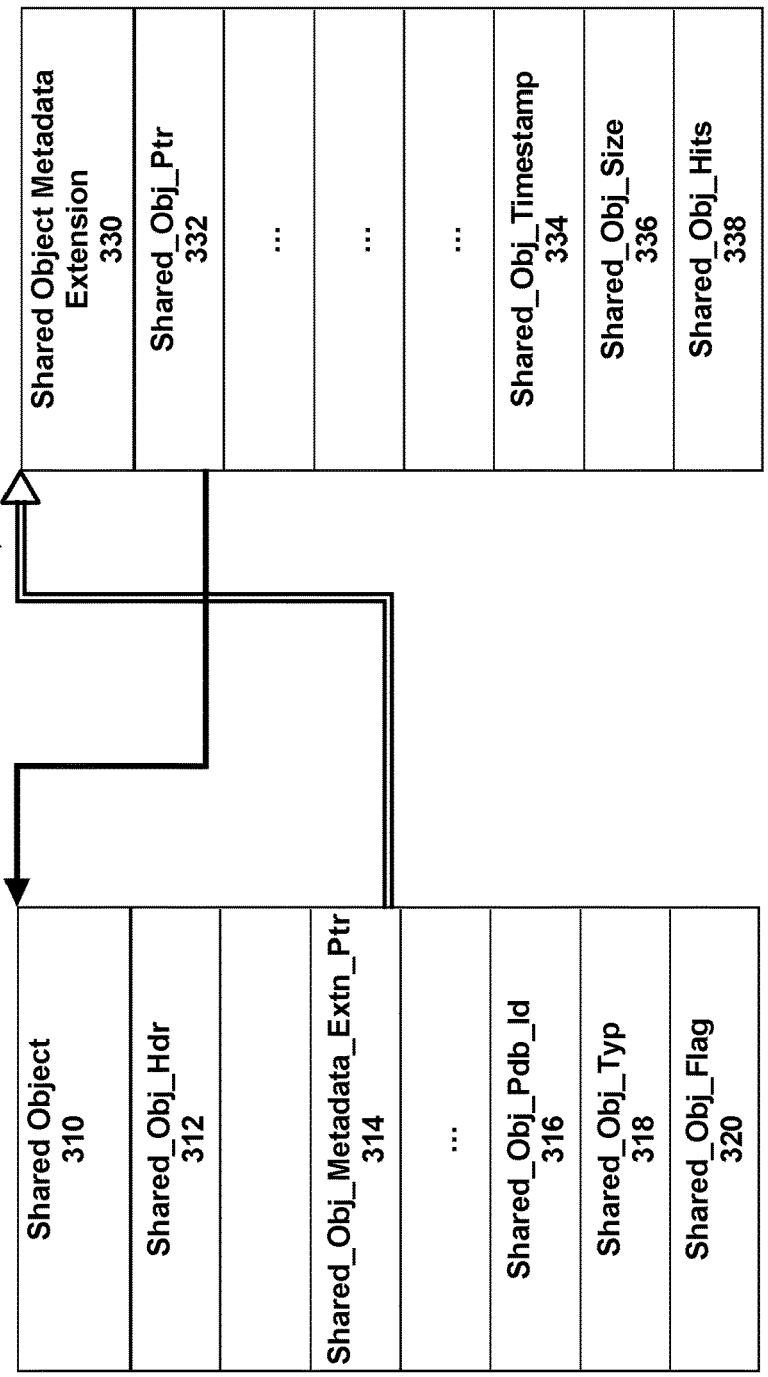
FIG. 3 is a diagram depicting a shared object, the shared object's metadata that is stored along with the shared object, and the shared object's metadata extension that is stored in a a shared object metadata structure according to an embodiment of the present invention.

FIG. 3 depicts both sets of metadata as follows: (i) Shared Object Metadata 311 of a Shared Object 310, which resides along with the shared object in the shared object cache, and (ii) Shared Object Metadata Extension 330 of Shared Object 310, which resides in the SOMEX of the PDB of the Shared Object 310. Shared Object Metadata 311 stores object-related metadata information such as header information, Shared_Obj_Hdr 312, an identifier of the PDB that the object is from, Shared_Obj_Pdb_Id 316, a type specification for the shared object, Shared_Obj_Typ 318, and a status flag associated with a status of the shared object in the shared object cache Shared_Obj_Flag 320. In addition, it also stores a pointer Shared_Obj_Metadata_Extn_Ptr 314 to the Shared Object Metadata Extension 330. The Shared Object Metadata Extension 330 stores additional metadata about the shared object such as timestamp information, Shared_Obj_Timestamp 334, a size of the shared object, Shared_Obj_Size 336, and a number of cache hits received by the shared object while in the shared object cache, Shared_Obj_Hits 338. In addition, this structure also stores a pointer, Shared_Obj_Ptr 332, to the Shared Object 310 that resides in the shared object cache.

Figure 4:
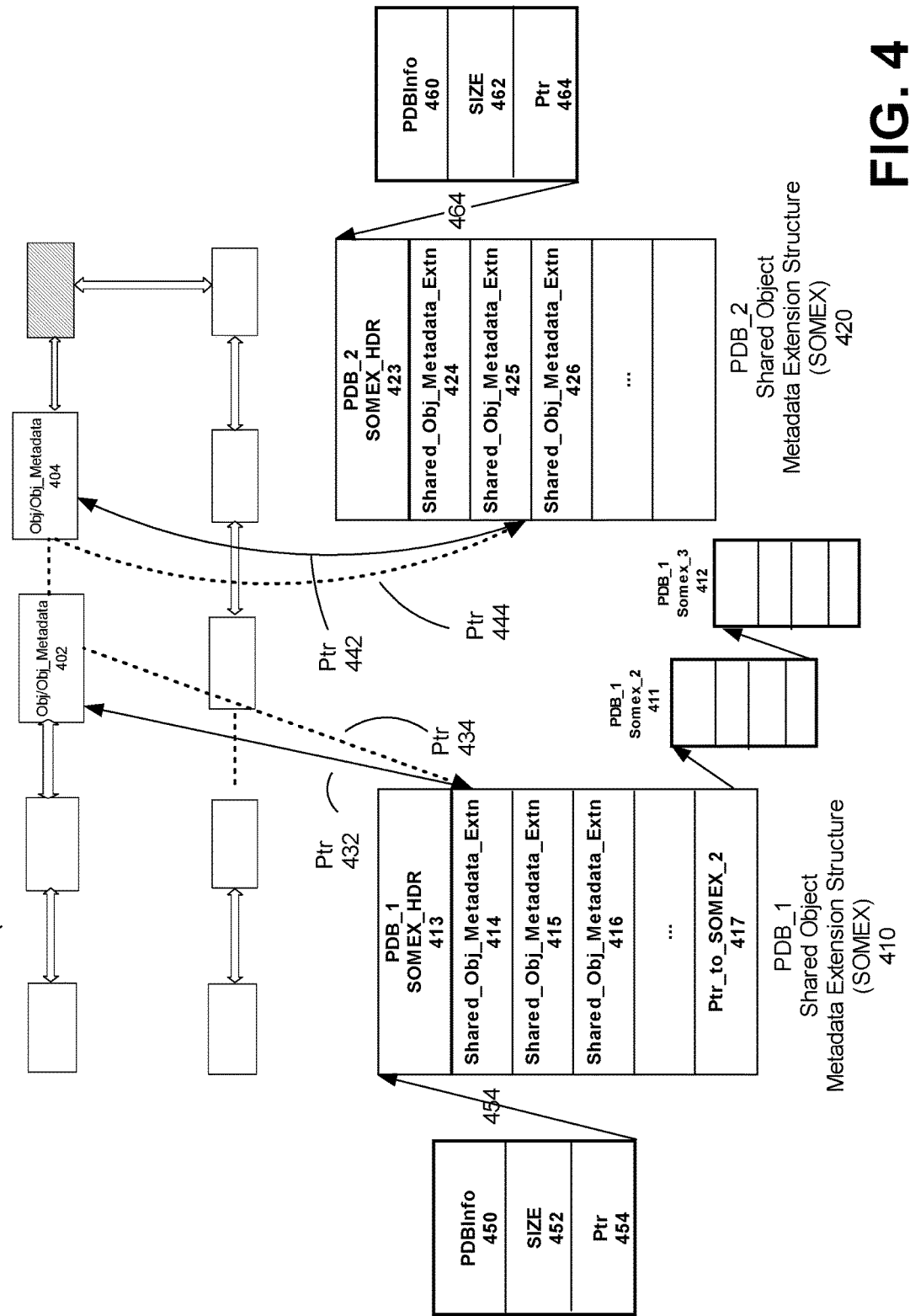
FIG. 4 is a diagram depicting shared objects in the shared object cache in relation to the respective metadata extensions of the shared objects according to an embodiment of the present invention.

FIG. 4 depicts shared objects in the shared object cache in relation to the respective metadata extensions of the shared objects. The metadata extensions reside in the respective SOMEXs of the respective PDBs of the shared objects. Two Shared Object Metadata Extension Structures, PDB_1 SOMEX 410 and PDB_2 SOMEX 430, are shown. Note that PDB_1 is depicted as having multiple linked SOMEXs. Thus SOMEX 410 is linked to SOMEX_2 411 and SOMEX_3 412. The linked SOMEXs are similar in structure to the first shown SOMEX 410. They also store metadata for the shared objects in the shared object cache for that PDB. The linked SOMEXs together stores metadata extensions for all the shared objects from that PDB that are residing currently in the shared object cache. PDB_1 SOMEX 410 is depicted as storing Shared_Obj_Metadata_Extn entries 414, 415, and 416, . . . corresponding to metadata extension information for different shared objects, such as Obj/Obj_Metadata 402, etc., from PDB_1 in the Shared Object Cache 400. Similarly, PDB_2 SOMEX 420 is depicted as storing Obj_Metadata_Extn entries 424, 425, 426 . . . corresponding to metadata extensions for different shared objects, such as Obj/Obj_Metadata 404, etc., from PDB_2 in the Shared Object Cache 400. As noted previously, for each shared object in the shared object cache, corresponding object metadata is also present in the shared object cache. With respect to FIG. 4, assuming that shared object Obj/Obj_Metadata 402 is of PDB_1, the metadata portion of Obj/Obj_Metadata 402 stores a pointer Ptr 434 that points to the shared object's metadata extension in PDB_1 SOMEX. The shared object's metadata extension Obj_Metadata_Extn 414 in PDB_1 SOMEX stores a pointer Ptr 432 that points back to the shared object Obj/Obj_Metadata 402 in the shared object cache. Similarly, assuming that shared object Obj/Obj_Metadata 404 is of PDB_2, the metadata portion of Obj/Obj_Metadata 404 stores a pointer Ptr 444 that points to the shared object's metadata extension in PDB_2 SOMEX. The shared object's metadata extension Obj_Metadata_Extn 436 in PDB_2 SOMEX stores a pointer Ptr 442 that points back to the shared object Obj/Obj_Metadata 404 in the shared object cache. FIG. 4 depicts metadata extension entries for other objects as well that reside in the shared object cache and that belong to PDB_1 (Shared_Obj_Metada_Extn 415, Shared_Obj_Metada_Extn 416) and that belong to PDB_2 (Shared_Obj_Metada_Extn425, Shared_Obj_Metada_Extn426).

FIG. 4 also depicts SOMEX header entries PDB_1 SOMEX_HDR 413 and PDB_2 SOMEX_HDR 423 that maintain header information associated with the entire SOMEX for each of PDB_1 and PDB_2 respectively. This header information can include, for instance, in an LRU implementation, the oldest timestamp for an entry in the SOMEX and an overall size of all the shared objects that correspond to the entries in the SOMEX. The oldest timestamp information may be obtained from the individual timestamps stored in the individual metadata entries in the SOMEX.

FIG. 4 also depicts data structures PDBInfo 450 and PDBInfo 460. Each PDBInfo is a data structure that is associated with a PDB. In FIG. 4, PDBInfo 450 os associated with PDB_1 and PDBInfo 460 is associated with PDB_2. The overall size of all the shared objects that correspond to the entries in a SOMEX (i.e., the sum of the sizes of the shared objects in a SOMEX) is stored in an entry in the PDBInfo. The PDBInfo also stores a pointer to the first SOMEX for the PDB. Thus, PDBInfo 450 has a size entry SIZE 452, and a pointer to SOMEX413, PTR 454. Similarly, PDBInfo 460 has a size entry SIZE 462, and a pointer to SOMEX423, PTR 464.

Updating a SOMEX of a PDB

When a shared object enters the shared object cache, an entry is created for the shared object in the SOMEX of the PDB of that shared object. This entry holds metadata information such as timestamp and size of that shared object. Each time the shared object is requested by a database process of a PDB session of container DBMS, the shared object's timestamp information is updated in the SOMEX entry of that shared object to reflect the cache hit. Furthermore, an access of any shared object of that PDB in the shared object cache may trigger an update of the metadata to reflect the oldest timestamp for any shared object of that PDB in that SOMEX's header. As each shared object is added or evicted from the shared object cache, the corresponding PDBInfo is updated to reflect the resulting size change of all shared objects in aggregate for that PDB in the shared object cache.

Maintaining a Maximum Limit for a PDB in the Shared Object Cache

As noted earlier, it is preferable to maintain each PDB's share of the shared object cache under a maximum limit. This is enforced by a background process that periodically examines each PDB's SOMEX.

The total size of a PDB's shared objects in the shared object cache may be obtained from the PDBInfo data structure. The total size of all objects from that PDB in the shared object cache is maintained here as objects enter and leave the shared object cache. The overall size may also be determined as a sum, or possibly some other function, of the shared object sizes derived from each shared object's metadata information about its size, i.e., as shown in Shared_Obj_Size 336 in FIG. 3.

Furthermore, in an embodiment using a shared object cache, if the shared object eviction employs an LRU policy, a timestamp-data function is employed to determine the timestamps associated with a specified oldest percentage of the data. Details of the timestamp-data function may be found in U.S. Pat. No. 8,549,238, herein incorporated by reference in its entirety. Processing timestamp-data function allows the dual-objective cache management system to return timestamp data related to an oldest N % of a set of objects that have timestamp metadata associated with them (i.e., make a determination such as the following: "anything an hour old is in the oldest 20% of the objects"). Thus, when a requirement to free up, say, N % of the PDB's objects from the shared object cache becomes necessary, the timestamp-data function may be used to determine the timestamps for identifying the shared objects that are to be evicted.

Figure 5:
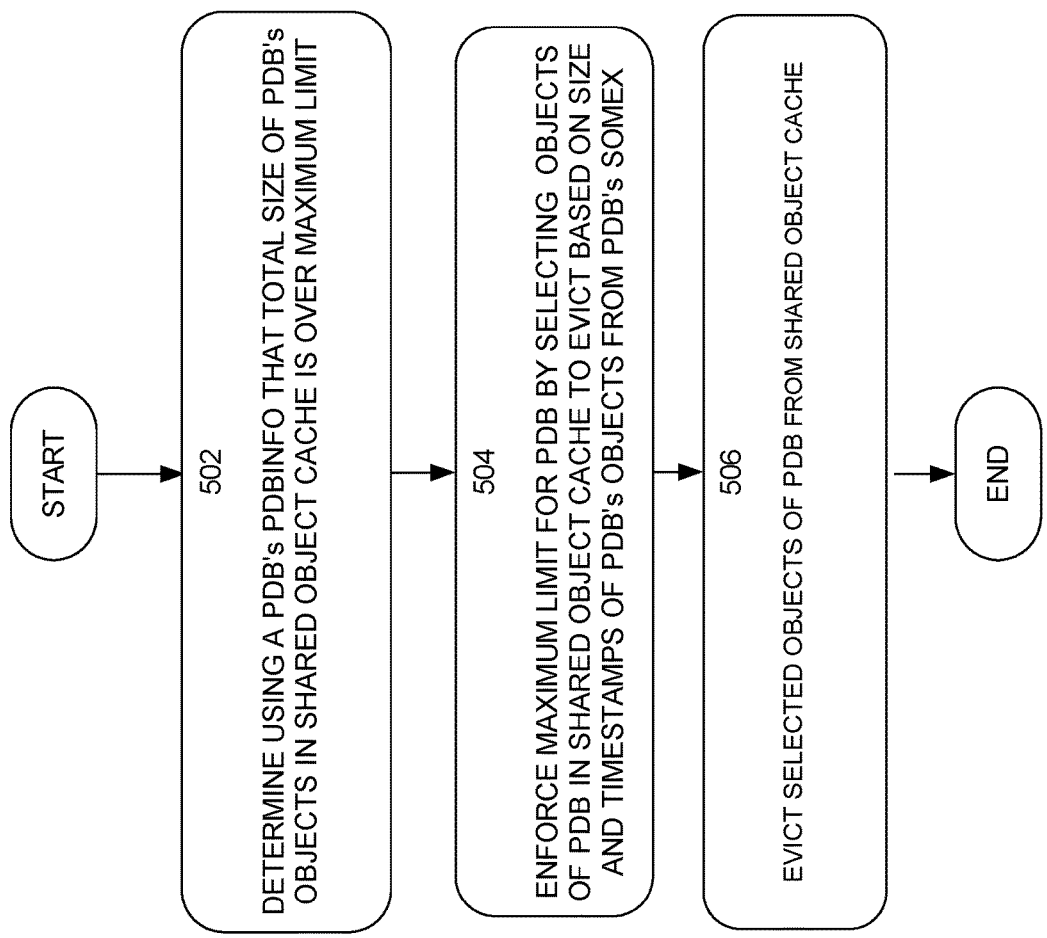
FIG. 5 is a diagram depicting a flow chart of operations that are performed for enforcing a maximum limit to a PDB's size share in the shared object cache.

FIG. 5 is a flow chart depicting a procedure for enforcing a maximum limit to a PDB's size share in the shared object cache. In step 502, the procedure starts by examining the total size of all objects in the PDBInfo data structure for the PDB, and determining that the PDB size is over a predetermined maximum limit. When the PDB size is over the allowed maximum limit, in step 504, the process selects a required number of shared objects from the shared object cache. The selection uses the timestamp-data function, and is based on the shared objects' sizes and timestamp data obtained from the PDB's SOMEX. The selection ensures that when these selected objects are evicted from the shared object cache, the PDB's share of the shared object cache falls below the maximum limit. In step 506, these selected objects are evicted from the shared object cache, thereby maintaining the PDB's share of the shared object cache at or below the maximum limit.

PDB Dedicated Min-Cache

To ensure that a minimum size of the shared object cache is always allocated for shared objects of each PDB, another cache is maintained for a PDB. This dedicated min-cache maintains a guaranteed minimum size of shared objects of a PDB. When a shared object of, for example, PDB M is most recently accessed or requested, this object is actually placed on PDB M's dedicated min-cache. This dedicated min-cache maintains shared objects at least of the guaranteed minimum size for PDB M. Maintaining a guaranteed minimum size of shared objects separately in the dedicated min-cache prevents unnecessary scanning of these objects in the shared object cache for eviction. This is because, as noted above, only the most recently accessed objects are placed in the dedicated min-cache, and avoiding this unnecessary scanning improves the shared object cache performance. When the size of shared objects of PDB M falls below the guaranteed minimum size in the shared object cache, it means that all of the shared objects of PDB M are in PDB M's dedicated min-cache As shared objects enter the dedicated min-cache, the dual-objective cache management system moves coldest objects out of the dedicated min-cache and into the shared object cache. The dedicated min-cache typically maintains just enough hottest objects to be at least the guaranteed minimum size for that PDB.

For example, if a guaranteed minimum size for a PDB is 10 MB and the dedicated min-cache for that PDB has 11 MB of shared objects. Then, when the coldest object is 1 MB, it can be moved out of the dedicated min-cache for that PDB and into the shared object cache. But, instead, when the coldest object is 2 MB in size, then it will be kept in the cache until shared objects entering the dedicated min-cache increase the dedicated min-cache size for that PDB to at least 12 MB. Moving the 2 MB size coldest object at this point will retain the dedicated min-cache size to the minimum size of 10 MB.

In an exemplary embodiment, both the shared object cache and the dedicated min-cache implement LRU policies. On a secondary implementation note, without being limiting, when a hottest object (i.e., in an LRU policy, for example, the most recently accessed object) is greater in size than the guaranteed minimum size, it will still be maintained in the dedicated min-cache for its PDB until it is required to move it onto the shared object cache; this will occur, for example, when newly accessed one or more objects totaling at least the guaranteed minimum size enter the dedicated min-cache.

In an alternate embodiment, newly accessed shared objects may always move into the dedicated min-cache at the hot end, and subsequently keep moving from the hot end towards the cold end as other objects enter the dedicated min-cache. When the dedicated min-cache has exceeded the PDB's minimum size requirement, then the shared objects may be moved out from the cold end of the dedicated min-cache and into the shared object cache as long as moving an object does not put the min-cache under the PDB minimum size.

When moving a shared object from the dedicated min-cache for a PDB into the shared object cache, the moved shared object is placed at an appropriate position relative to the other shared objects in the shared object cache. Metadata associated with the shared object guides the placement. Thus, in the previously described example, when the coldest object from PDB M's dedicated min-cache is moved into the shared object cache, the moved shared object is placed at a point in the shared object cache based on the shared object's timestamp information. Thus, without being limiting, timestamp information may be used to approximately maintain a valid time-based order of objects in the shared object cache.

Without being limiting, one approach to using timestamp information for object placement in the shared object cache is to maintain a set of time markers in the shared object cache. For example, 60 one-second markers, 60 one-minute markers, and a 100 one-hour markers can be maintained on the shared object cache. When moving shared objects from the dedicated min-cache into the shared object cache, the placement of each of the shared objects on the shared object cache is based on each object's timestamp in its metadata, and guided by the presence of a suitably approximate time marker on the shared object cache.

Figure 6:
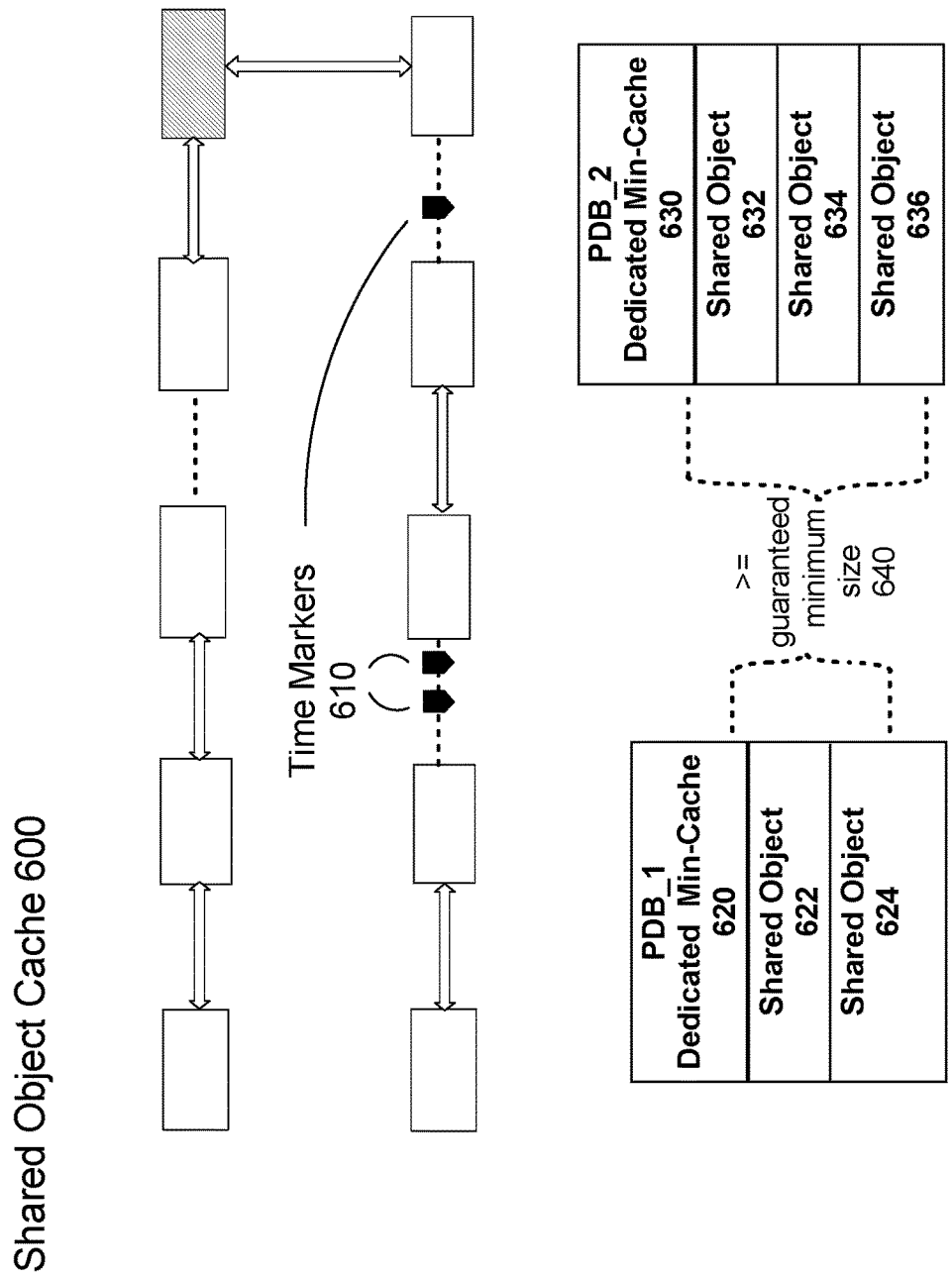
FIG. 6 is a diagram depicting a shared object cache and two dedicated min-caches maintained in the container DBMS.

FIG. 6 depicts a Shared Object Cache 600 as well as two dedicated min-caches, PDB_1 Dedicated Min-Cache 620 and PDB_2 Dedicated Min-Cache 630. There may be several dedicated min-caches each corresponding to a PDB in the container DBMS. PDB_1 Dedicated Min-Cache has Shared Object 622 and Shared Object 624. The combined sizes of the two shared objects 622 and 624 will be at least equal to the guaranteed minimum size for PDB_1. Similarly, PDB_2 Dedicated Min-Cache has Shared Object 632, Shared Object 634, and Shared Object 636. The sizes of the three shared objects 632, 634, and 636 will be at least equal to the guaranteed minimum size for PDB_2. As noted previously, shared objects enter the dedicated min-cache and the dual-objective cache management system moves coldest objects out of the dedicated min-cache and into the shared object cache. FIG. 6 also depicts Time Markers 610 that are used to place moved objects into the Shared Object Cache 600.

Figure 7:
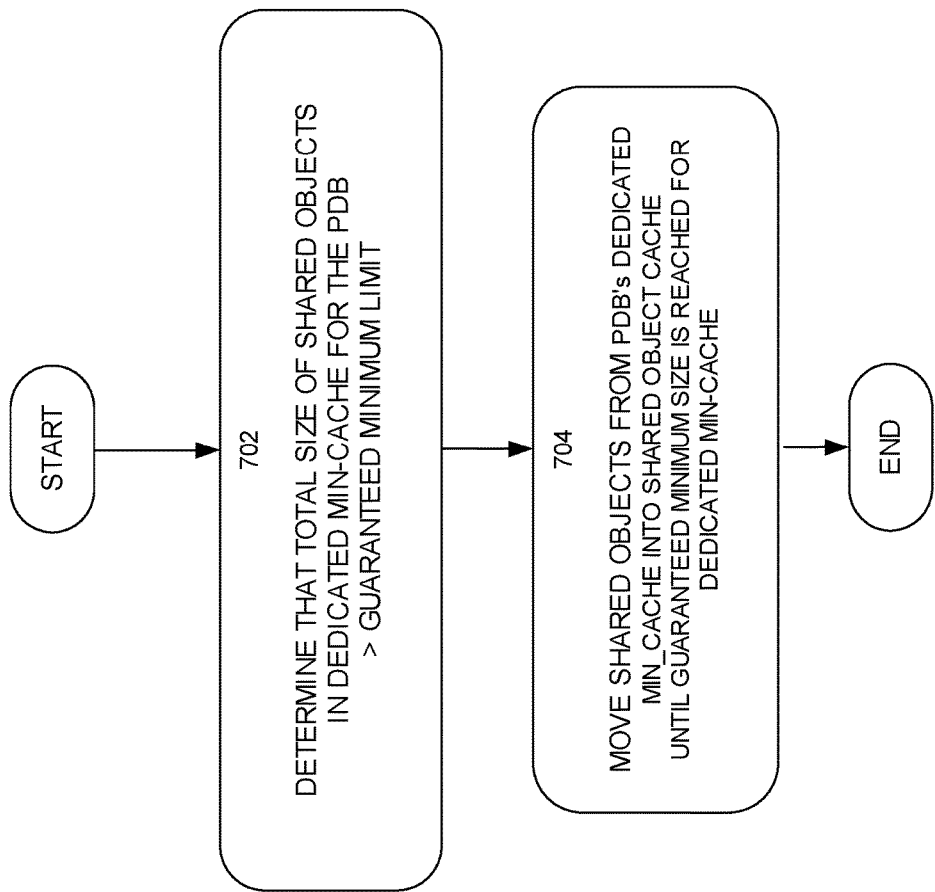
FIG. 7 is a diagram depicting a flow chart of operations that are performed for guaranteeing a minimum limit to a PDB's size share in the shared object cache according to an embodiment of the present invention.

FIG. 7 depicts a flow chart for guaranteeing a minimum limit to a PDB's dedicated min-cache size. In step 702, the process starts by determining that the total size of shared objects in the dedicated min-cache for a PDB is greater than the guaranteed minimum size for that PDB. In step 704, the process moves enough of the coldest shared objects from the dedicated min-cache for that PDB into the shared object cache until the guaranteed minimum size for the dedicated min-cache is met.

Life Cycle of a Shared Object

An exemplary life cycle of a shared object in a PDB with respect to the shared objective cache may be as follows:

Shared Object A, in a particular PDB M, is requested by a database process running in a container DBMS.

An entry is added to the SOMEX of PDB M regarding the metadata extension of Shared Object A.

Shared Object A is placed in the dedicated min-cache P of PDB M.

Shared Object A moves from the hottest to the coldest end of the dedicated min-cache P as other newer shared objects of PDB M are requested, and move into the dedicated min-cache.

When the size of shared objects in the min-cache P becomes greater than PDB M's minimum size, Shared Object A (as the coldest object in the min-cache) is moved from the min-cache into the shared object cache—Shared Object A is placed in the shared object cache at a point determined by its timestamp and the time-markers residing on the shared object cache.

Shared Object A moves along the shared object cache towards the cold end until Shared Object A is used again or replaced. If used again (i.e., hit), Shared Object A moves to the separator or the hot end, and begins moving towards the cold end again.

When a background process determines that the guaranteed size of objects from PDB M is exceeding the maximum limit, the background process selects, for eviction, shared objects from PDB M that are currently in the shared object cache—if Shared Object A is among the coldest shared objects for PDB M (as determined by looking at the SOMEX of PDB M) then it is selected for eviction.

Shared Object A is evicted from the shared object cache, and the SOMEX of PDB M is updated to remove the related metadata entry for Shared Object A.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
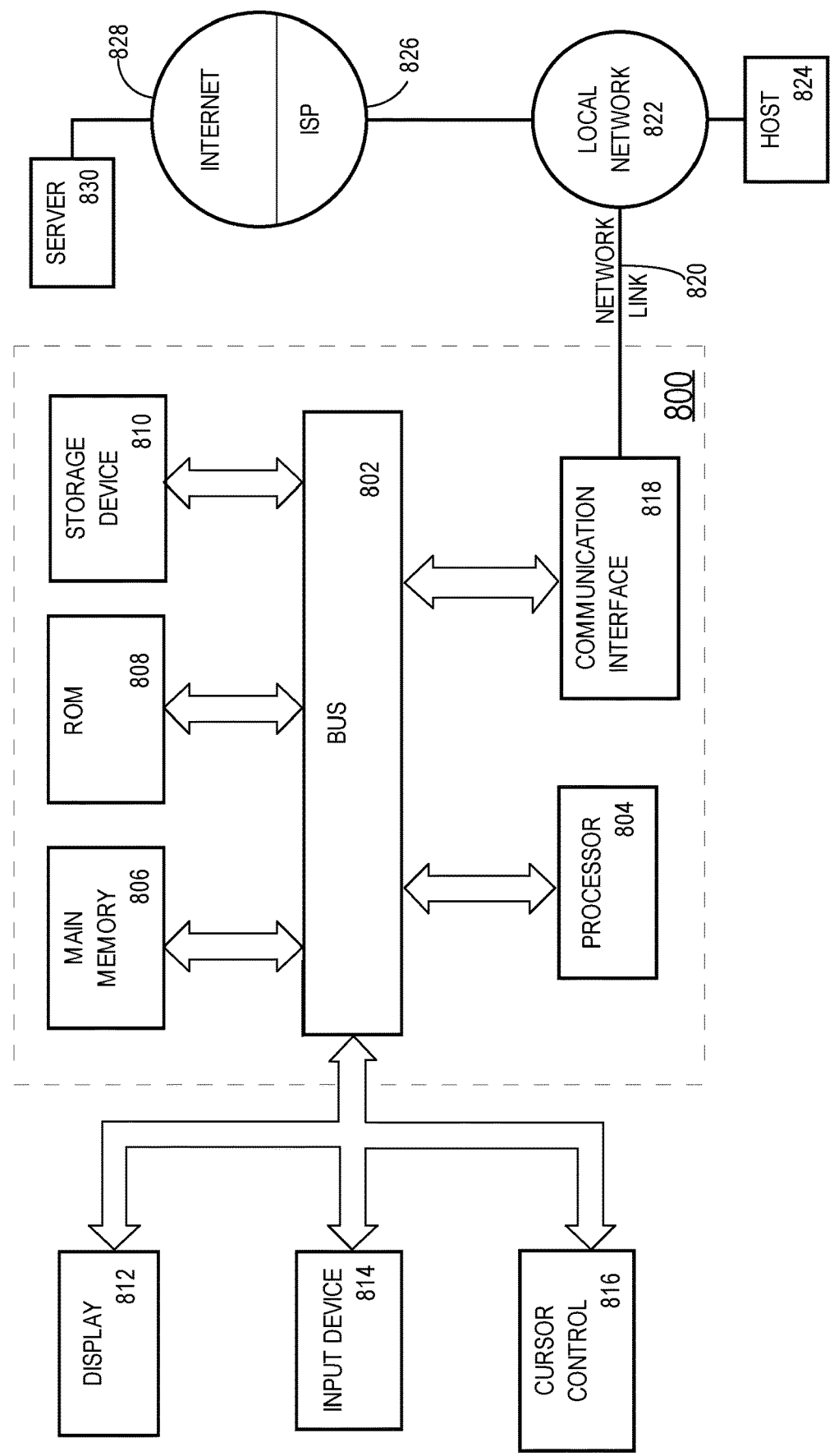
FIG. 8 is a diagram depicting a computer system that may be used in an embodiment of the present invention.

For example, FIG. 8 is a block diagram that illustrates a computer system 800 upon which an embodiment of the invention may be implemented. Computer system 800 includes a bus 802 or other communication mechanism for communicating information, and a hardware processor 604 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method, comprising:
   maintaining a shared object cache of shared objects, each shared object of said shared objects being stored in said shared object cache for a respective pluggable database (PDB) of a plurality of PDBs hosted by a container database management system (DBMS);
   wherein said container DBMS includes a plurality of PDB dictionaries;
   wherein each PDB dictionary of said plurality of PDB dictionaries is dedicated to a respective PDB of said plurality of PDBs and defines database objects of said respective PDB;
   wherein a container database dictionary of said container DBMS defines each PDB of said plurality of PDBs;
   maintaining, for each PDB in said plurality of PDBs, a respective shared object metadata extension structure (SOMEX), of a plurality of SOMEXs, that contains entries, each entry of said entries storing metadata for a respective shared object, of said each PDB, in the shared object cache; and
   enforcing, for each PDB in said plurality of PDBs, a limited share of the shared object cache for storing shared objects of said PDB, said enforcing based on the entries in the respective SOMEX maintained for said each PDB.

2. The method of claim 1, further comprising: for a particular PDB of said plurality of PDBs, identifying a shared object, for the particular PDB, from the shared object cache using an entry, for said shared object, in a SOMEX maintained for said particular PDB.

3. The method of claim 1, wherein, for each shared object in the shared object cache, an associated SOMEX entry, in a SOMEX of the plurality of SOMEXs, stores metadata for said each shared object, wherein the metadata comprises at least one of: a timestamp of said each shared object indicating a time said each shared object was accessed from the shared object cache, a size of said each shared object, and a number of cache hits of said each shared object.

4. The method of claim 3, wherein the metadata in the associated SOMEX entry for each shared object in the shared object cache further comprises a first pointer to said each shared object in the shared object cache.

5. The method of claim 4, further comprising: storing, for each shared object in the shared object cache, in a header of said shared object in the shared object cache, a second pointer to the associated SOMEX entry.

6. The method of claim 1, further comprising: for a particular PDB of said plurality of PDBs, enforcing, based on a particular SOMEX, of the plurality of SOMEXs, a maximum allowable size in the shared object cache for shared objects of said particular PDB, wherein the particular SOMEX is associated with the particular PDB.

7. The method of claim 6, wherein enforcing the maximum allowable size in the shared object cache for shared objects of said particular PDB comprises:
   based on the particular SOMEX of said particular PDB, determining that a total size of said shared objects of said particular PDB in the shared object cache is over the maximum allowable size; and
   selecting one or more shared objects of said particular PDB in the shared object cache to evict such that a second total size of the shared objects for said particular PDB in the shared object cache, other than the selected one or more shared objects, is below the maximum allowable size.

8. The method of claim 1, further comprising maintaining, for a particular PDB of the plurality of PDBs, a particular dedicated min-cache that stores one or more shared objects of the particular PDB.

9. The method of claim 8, wherein maintaining, for said particular PDB, the particular dedicated min-cache comprises enforcing a minimum guaranteed size in the particular dedicated min-cache for shared objects of said particular PDB.

10. The method of claim 9, wherein:
    said one or more shared objects, of the particular PDB, stored in the particular dedicated min-cache comprises two or more shared objects; and
    the method further comprises:
       detecting that a size of said particular dedicated min-cache of said particular PDB is above the minimum guaranteed size, and
       in response to detecting that the size of said particular dedicated min-cache of said particular PDB is above the minimum guaranteed size, moving one or more particular shared objects, of the two or more shared objects, from the particular dedicated min-cache to the shared object cache,
       wherein, after moving the one or more particular shared objects from the particular dedicated min-cache, the particular min-cache maintains the minimum guaranteed size.

11. The method of claim 10, wherein said moving the one or more particular shared objects from the particular dedicated min-cache to the shared object cache is performed in a particular order that is based on one or more timestamps, of the one or more particular shared objects, stored in one or more entries in a particular SOMEX, of the plurality of SOMEXs, wherein the particular SOMEX is associated with the particular PDB.

12. The method of claim 11, wherein the one or more particular shared objects comprise a particular shared object, the method further comprising using a time marker on the shared object cache along with a timestamp associated with the particular shared object to determine where to place the particular shared object in the shared object cache.

13. One or more non-transitory computer-readable media storing one or more sequences of instructions that, when executed by one or more processors, cause:
maintaining a shared object cache of shared objects, each shared object of said shared objects being stored in said shared object cache for a respective pluggable database (PDB) of a plurality of PDBs hosted by a container database management system (DBMS);
wherein said container DBMS includes a plurality of PDB dictionaries;
wherein each PDB dictionary of said plurality of PDB dictionaries is dedicated to a respective PDB of said plurality of PDBs and defines database objects of said respective PDB;
wherein a container database dictionary of said container DBMS defines each PDB of said plurality of PDBs;
maintaining, for each PDB in said plurality of PDBs, a respective shared object metadata extension structure (SOMEX), of a plurality of SOMEXs, that contains entries, each entry of said entries storing metadata for a respective shared object, of said each PDB, in the shared object cache; and
enforcing, for each PDB in said plurality of PDBs, a limited share of the shared object cache for storing shared objects of said each PDB, said enforcing based on the entries in the respective SOMEX maintained for said each PDB.

14. The one or more non-transitory computer-readable media of claim 13, wherein the one or more sequences of instructions further comprise instructions that, when executed by one or more processors, cause for a particular PDB of said plurality of PDBs, identifying a shared object, for the particular PDB, from the shared object cache using an entry, for said shared object, in a SOMEX maintained for said particular PDB.

15. The one or more non-transitory computer-readable media of claim 13, wherein, for each shared object in the shared object cache, an associated SOMEX entry, in a SOMEX of the plurality of SOMEXs, stores metadata for said each shared object, wherein the metadata comprises at least one of: a timestamp of said each shared object indicating a time said each shared object was accessed from the shared object cache, a size of said each shared object, and a number of cache hits of said each shared object.

16. The one or more non-transitory computer-readable media of claim 15, wherein the metadata in the associated SOMEX entry for each shared object in the shared object cache further comprises a first pointer to said each shared object in the shared object cache.

17. The one or more non-transitory computer-readable media of claim 16, wherein the one or more sequences of instructions further comprise instructions that, when executed by one or more processors, cause storing, for each shared object in the shared object cache, in a header of said shared object in the shared object cache, a second pointer to the associated SOMEX entry.

18. The one or more non-transitory computer-readable media of claim 13, wherein the one or more sequences of instructions further comprise instructions that, when executed by one or more processors, cause for a particular PDB of said plurality of PDBs, enforcing, based on a particular SOMEX, of the plurality of SOMEXs, a maximum allowable size in the shared object cache for shared objects of said particular PDB, wherein the particular SOMEX is associated with the particular PDB.

19. The one or more non-transitory computer-readable media of claim 18, wherein enforcing the maximum allowable size in the shared object cache for shared objects of said particular PDB comprises:
based on the particular SOMEX of said particular PDB, determining that a total size of said shared objects of said particular PDB in the shared object cache is over the maximum allowable size; and
selecting one or more shared objects of said particular PDB in the shared object cache to evict such that a second total size of the shared objects for said particular PDB in the shared object cache, other than the selected one or more shared objects, is below the maximum allowable size.

20. The one or more non-transitory computer-readable media of claim 13 wherein the one or more sequences of instructions further comprise instructions that, when executed by one or more processors, cause maintaining, for a particular PDB of the plurality of PDBs, a particular dedicated min-cache that stores one or more shared objects of the particular PDB.

21. The one or more non-transitory computer-readable media of claim 20, wherein maintaining, for said particular PDB, the particular dedicated min-cache comprises enforcing a minimum guaranteed size in the particular dedicated min-cache for shared objects of said particular PDB.

22. The one or more non-transitory computer-readable media of claim 21, wherein:
said one or more shared objects, of the particular PDB, stored in the particular dedicated min-cache comprises two or more shared objects; and
the one or more sequences of instructions further comprise instructions that, when executed by one or more processors, cause:
detecting that a size of said particular dedicated min-cache of said particular PDB is above the minimum guaranteed size, and
in response to detecting that the size of said particular dedicated min-cache of said particular PDB is above the minimum guaranteed size, moving one or more particular shared objects, of the two or more shared objects, from the particular dedicated min-cache to the shared object cache,
wherein, after moving the one or more particular shared objects from the particular dedicated min-cache, the particular dedicated min-cache maintains the minimum guaranteed size.

23. The one or more non-transitory computer-readable media of claim 22, wherein said moving the one or more particular shared objects from the particular dedicated min-cache to the shared object cache is performed in a particular order that is based on one or more timestamps, of the one or more particular shared objects, stored in one or more entries in a particular SOMEX, of the plurality of SOMEXes, wherein the particular SOMEX is associated with the particular PDB.

24. The one or more non-transitory computer-readable media of claim 23, wherein:
the one or more particular shared objects comprise a particular shared object; and the one or more sequences of instructions further comprise instructions that, when executed by one or more processors, cause using a time marker on the shared object cache along with a timestamp associated with the particular shared object to determine where to place the particular shared object in the shared object cache.

* * * * *

UNITED STATES PATENT AND TRADEMARK OFFICE
CERTIFICATE OF CORRECTION

PATENT NO. : 10,747,782 B2
APPLICATION NO. : 15/685489
DATED : August 18, 2020
INVENTOR(S) : Chatterjee et al.

Page 1 of 1

It is certified that error appears in the above-identified patent and that said Letters Patent is hereby corrected as shown below:

In the Specification

In Column 2, Line 6, delete "a a" and insert -- a --, therefor.

In Column 9, Line 58, delete "os" and insert -- is --, therefor.

In Column 11, Line 18, delete "min-cache" and insert -- min-cache. --, therefor.

In the Claims

In Column 15, Line 58, in Claim 1, delete "said PDB," and insert -- said each PDB, --, therefor.

In Column 16, Line 14, in Claim 5, after "said" insert -- each --.

In Column 16, Line 61, in Claim 10, after "particular" insert -- dedicated --.

In Column 17, Line 63, in Claim 17, after "said" insert -- each --.

In Column 18, Line 61, in Claim 23, delete "SOMEXes," and insert -- SOMEXs, --, therefor.

Signed and Sealed this
Fourth Day of May, 2021

Drew Hirshfeld
*Performing the Functions and Duties of the*
*Under Secretary of Commerce for Intellectual Property and*
*Director of the United States Patent and Trademark Office*